United States Patent
Hadley

(10) Patent No.: US 7,568,349 B2
(45) Date of Patent: Aug. 4, 2009

(54) METHOD FOR CONTROLLING COMBUSTION DEVICE DYNAMICS

(75) Inventor: Mark Allan Hadley, Greenville, SC (US)

(73) Assignee: General Electric Company, Schenectady, NY (US)

( * ) Notice: Subject to any disclaimer, the term of this patent is extended or adjusted under 35 U.S.C. 154(b) by 482 days.

(21) Appl. No.: 11/241,446

(22) Filed: Sep. 30, 2005

(65) Prior Publication Data

US 2007/0074519 A1   Apr. 5, 2007

(51) Int. Cl.
*F02C 9/26* (2006.01)

(52) U.S. Cl. ............... 60/776; 60/39.281; 431/1

(58) Field of Classification Search ............ 60/39.281, 60/734, 773, 776; 431/1, 62
See application file for complete search history.

(56) References Cited

U.S. PATENT DOCUMENTS

| | | | | |
|---|---|---|---|---|
| 5,349,811 A | * | 9/1994 | Stickler et al. | ............ 60/776 |
| 6,059,560 A | | 5/2000 | Richards et al. | |
| 6,202,401 B1 | * | 3/2001 | Seume et al. | ............ 60/776 |
| 6,595,002 B2 | * | 7/2003 | Weisenstein | ............ 60/776 |
| 6,786,049 B2 | * | 9/2004 | Parsons et al. | ............ 60/776 |

* cited by examiner

*Primary Examiner*—Louis J Casaregola
(74) *Attorney, Agent, or Firm*—Armstrong Teasdale LLP

(57) ABSTRACT

A method for controlling a combustion dynamics level within a combustion device includes defining a high dynamics operating state at a first fuel split ratio. The first fuel split ratio is a ratio of an amount of fuel supplied to the combustion device through a first fuel line to a total amount of fuel supplied to the combustion device. A low dynamics operating state is defined at a second fuel split ratio different from the first fuel split ratio. The second fuel split ratio is a second ratio of an amount of fuel supplied to the combustion device through the first fuel line to a total amount of fuel supplied to the combustion device. The combustion dynamics level within the combustion device is controlled by periodically switching between the first fuel split ratio and the second fuel split ratio.

9 Claims, 3 Drawing Sheets

METHOD FOR CONTROLLING COMBUSTION DEVICE DYNAMICS

BACKGROUND OF THE INVENTION

This invention relates generally to combustion devices and, more particularly, to a method and apparatus for controlling combustion dynamics developed within combustion devices.

Gas turbine engines typically include a compressor section, a combustor section, and at least one turbine section. The compressor compresses air, which is mixed with fuel and channeled to the combustor. The mixture is then ignited to generate hot combustion gases. The combustion gases are channeled to the turbine which extracts energy from the combustion gases for powering the compressor, as well as producing useful work to power a load, such as to propel an aircraft in flight.

Gas turbine engines operate in many different operating conditions, and combustor performance facilitates engine operation over a wide range of engine operating conditions. Controlling combustor performance improves overall gas turbine engine operations. For example, at least some gas turbine low $NO_X$ emissions combustion systems employ a process known as lean premixed combustion wherein fuel and combustion air are mixed upstream of the combustion zone to facilitate controlling $NO_X$ production. Such systems often function well over a relatively narrow operating range. Outside of the range, combustion dynamics levels (noise due to oscillatory combustion process) may approach an amplitude that can shorten the maintenance intervals and/or ultimately cause component damage and failure.

BRIEF DESCRIPTION OF THE INVENTION

In one aspect, a method for controlling a combustion dynamics level within a combustion device is provided. A high dynamics operating state is defined at a first fuel split ratio. The first fuel split ratio is a ratio of an amount of fuel supplied to the combustion device through a first fuel line to a total amount of fuel supplied to the combustion device. A low dynamics operating state is defined at a second fuel split ratio different from the first fuel split ratio. The second fuel split ratio is a second ratio of an amount of fuel supplied to the combustion device through the first fuel line to a total amount of fuel supplied to the combustion device. Periodic switching between the first fuel split ratio and the second fuel split ratio controls the combustion dynamics level within the combustion device.

In another aspect, a method to facilitate controlling a combustion dynamics level within a combustion device is provided. The method includes defining a combustion dynamics level and a $NO_X$ emissions level for a plurality of fuel split ratios for an operating range of the combustion device. The combustion dynamics level is a measurement of pressure within the combustion device during a combustion process. The $NO_X$ emissions level is a measurement of $NO_X$ emitted from the combustion device during the combustion process. The fuel split ratio is a ratio of an amount of fuel supplied to the combustion device through a first fuel line to a total amount of fuel supplied to the combustion device. A first operating state defined by a first fuel split ratio and a second operating state defined by a second fuel split ratio different from the first operating state is determined. The combustion dynamics level is controlled within the combustion device based on the first operating state and the second operating state.

In another aspect, a system for controlling combustion dynamics levels within a combustion device is provided. The system includes a first fuel line in flow communication with a first premix chamber formed within a combustion casing of the combustion device and a second fuel line in flow communication with a second chamber formed at least partially within the combustion casing. A fuel transfer circuit is in independent operational control communication with each of the first fuel line and the second fuel line. The fuel transfer circuit controls an amount of fuel flowing through the first fuel line into the first premix chamber and an amount of fuel flowing through the second fuel line into the second chamber.

DETAILED DESCRIPTION OF THE INVENTION

The present invention provides a method and apparatus for controlling combustion dynamics within a combustion device, such as a gas turbine engine, wherein a fuel transfer circuit controls a path of at least a portion of the fuel supplied to the gas turbine engine through a first fuel source and/or a second fuel source. By modulating or switching fuel split ratios between a high dynamics operating state and a relatively low dynamics operating state, undesirable combustion dynamics, including pressure oscillations and/or acoustical vibrations, developed within the gas turbine engine during the combustion process are prevented or minimized. In one embodiment, a firing temperature at which a first fuel split ratio is selected to define a first operating state is the same as a firing temperature at which a second fuel split ratio is selected to define a second operating state.

The present invention is described below in reference to its application in connection with and operation of a stationary gas turbine engine. However, it will be obvious to those skilled in the art and guided by the teachings herein provided that the invention is likewise applicable to any combustion device including, without limitation, boilers, heaters and other gas turbine engines, and may be applied to systems consuming natural gas, fuel, coal, oil or any solid, liquid or gaseous fuel.

As used herein, references to "combustion" are to be understood to refer to a chemical process wherein oxygen, e.g., air, combines with the combustible elements of fuel, namely carbon, hydrogen and sulfur, at an elevated temperature sufficient to ignite the constituents.

Figure 1:
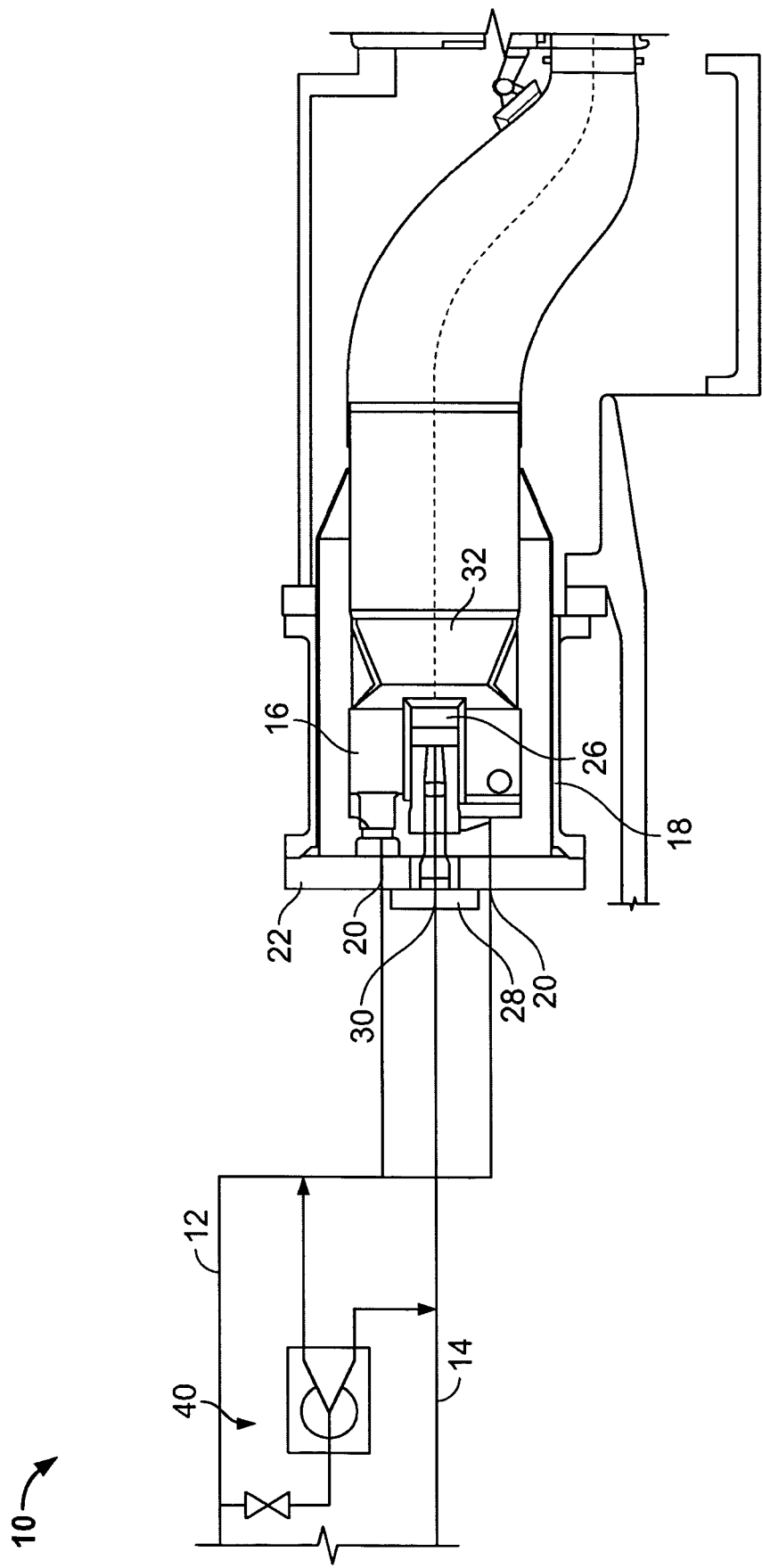
FIG. 1 shows a fuel transfer circuit coupled to a combustion device, according to one embodiment of this invention.

As shown in FIG. 1, a combustion device, such as a gas turbine engine 10, includes a first or primary fuel line 12 and a second or secondary fuel line 14 independently operatively connected to engine 10. As shown in FIG. 1, first fuel line 12 is in flow communication at least one entry orifice 20 with a first region, such as a first premix chamber 16 formed within a combustion casing 18. In one embodiment, first fuel line 12 extends through a first fuel nozzle cover 22 and into first premix chamber 16 at a plurality of entry orifices 20 positioned about first fuel nozzle cover 22. Second fuel line 14 is in flow communication with a second region, such as a second chamber 26 at least partially formed within combustion casing 18. As shown in FIG. 1, second fuel line 14 extends through a second nozzle assembly 28 at an entry orifice 30 and into a venturi assembly 32 positioned at a downstream portion of second chamber 26. In one embodiment, first premix chamber 16 and second chamber 26 run in parallel. In an alternative embodiment, first premix chamber 16 and second chamber 26 combine or mix together downstream.

As shown in FIG. 1, engine 10 includes a fuel transfer circuit 40 that controls an amount of fuel that flows through first fuel line 12 and/or second fuel line 14 into respective first premix chamber 16 and second chamber 26. In one embodiment, fuel transfer circuit 40 is in independent operational control communication with first fuel line 12 and/or second fuel line 14. Fuel transfer circuit 40 is a fluidic oscillator that selectively controls the fuel flow through first fuel line 12 and/or second fuel line 14. Alternatively, fuel transfer circuit 40 includes a suitable mechanical or fluidic valve assembly for controlling fuel flow through first fuel line 12 and/or second fuel line 14. Other suitable oscillator assemblies and/or valve assemblies known to those skilled in the art and guided by the teachings herein provided can be used to control fuel flow through first fuel line 12 and/or second fuel line 14.

A theoretical or ideal fuel split ratio results when each fuel line provides an equal amount or percentage of the total fuel consumed by the engine. A possible fuel split with two fuel supply lines, for example first fuel line 12 and second fuel line 14, can be 50:50, wherein first fuel line supplies 50% of the total fuel consumed by the engine and second fuel line supplies 50% of the total fuel consumed by the engine. However, a 50:50 fuel split ratio is infeasible due to combustion dynamics levels, including pressure oscillations and/or acoustical vibrations, which develop within the engine during the combustion process. Such combustion dynamics levels ultimately result in engine component damage and/or engine failure.

To avoid such combustion dynamics levels, conventional engines run at a constant offset ratio to prevent engine failure. For example, a conventional engine including two fuel supply lines is configured such that a first fuel supply line constantly supplies about 10% to about 90% of the total fuel consumed by the engine and a second fuel supply line constantly supplies the remaining fuel.

Figure 2:
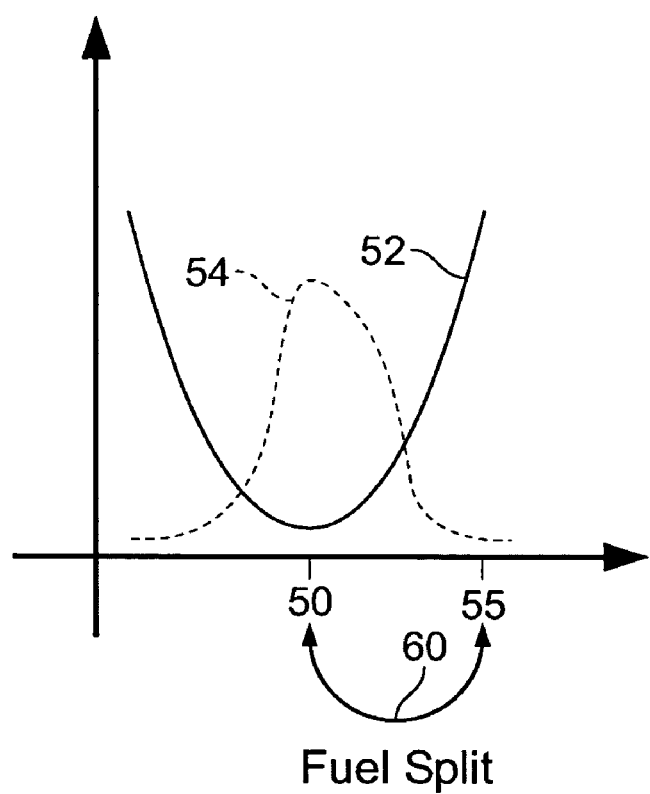
FIG. 2 is a graphical representation of a combustion dynamics level and a $NO_X$ emission level verses fuel split ratios within an operating range for the combustion device.

In contrast to conventional engine configurations, the method and apparatus of the present invention provides a fuel split ratio that is periodically modulated or switched between a first fuel split ratio and a second fuel split ratio to actively control the combustion dynamics levels developed within engine 10 and prevent undesired pressure oscillations and/or acoustical vibrations. In one embodiment, during a first operating state 50 having a first fuel split ratio, engine 10 operates within a high dynamic state, as shown in FIG. 2. The high dynamic state is within an unstable operating region and is defined by a relatively low $NO_X$ emissions level (along curve 52) but an increased combustion dynamics level (along curve 54). In one embodiment, first fuel line 12 supplies about 10% to about 90%, for example 45%, of the total fuel consumed by engine 10 during first operating state 50. Second fuel line 14 supplies the remaining percentage, for example about 55%, of the total fuel consumed by engine 10. First operating state 50 has a set time duration of about 10 msec to about 100 msec. In alternative embodiments, first operating state 50 has a time duration less than about 10 msec or greater than about 100 msec, as desired.

Figure 3:
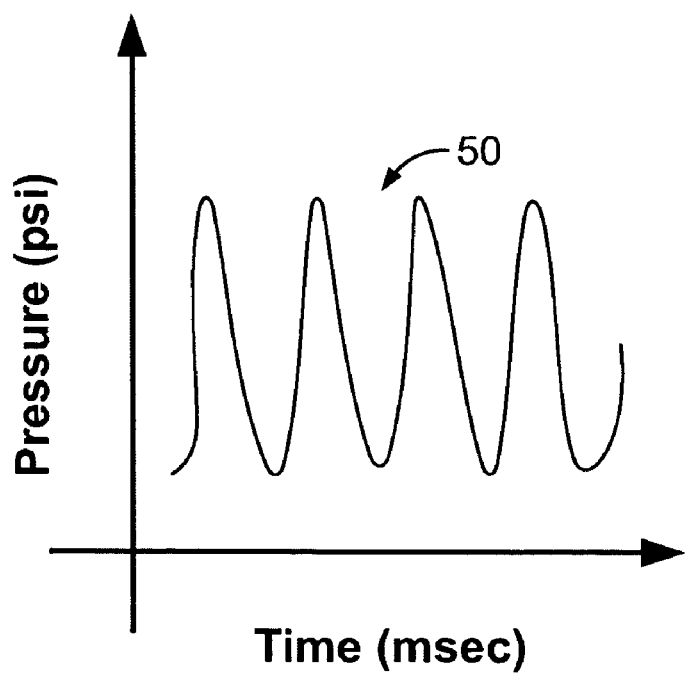
FIG. 3 is a graphical representation of a pressure wave developed within a combustion device operating at a high dynamic state verses time.

FIG. 3 graphically represents the pressure oscillations measured in pounds per square inch within engine 10 during engine operation at first operating state 50 (high dynamics operating state). Over a time duration, an amplitude of the pressure increases and approaches an undesirable maximum amplitude, which represents an undesirable, relatively high combustion dynamics level. At an expiration of the time duration, before the maximum amplitude is reached, fuel transfer circuit 40 is activated to initiate a change in engine operation to a second operating state 55 to reduce the combustion dynamics experienced during operation at first operating state 50. Fuel transfer circuit 40 controls the switching from the first fuel split ratio to a second fuel split ratio to actively control the combustion dynamics level developed within engine 10. The switching from first operating state 50 to second operating state 55 is represented by reversible arrow 60 in FIG. 2.

During second operating state 55 having a second fuel split ratio, engine 10 operates within a low dynamic state, as shown in FIG. 2. The low dynamic state is within a stable operating region and is defined by a relatively low combustion dynamics level but an increased $NO_X$ emissions level. During second operating state 55, first fuel line 12 supplies about 10% to about 90%, for example about 55%, of the total fuel consumed by engine 10 and second fuel line 14 supplies the remaining percentage, for example about 45%, of the total fuel consumed by engine 10. First fuel line 12 and second fuel line 14 each supplies the selected amount of fuel during second operating state 55, over a suitable time period of about 10 msec to about 100 msec. In alternative embodiments, second operating state 55 has a set time duration less than about 10 msec or greater than about 100 msec, as desired.

Figure 4:
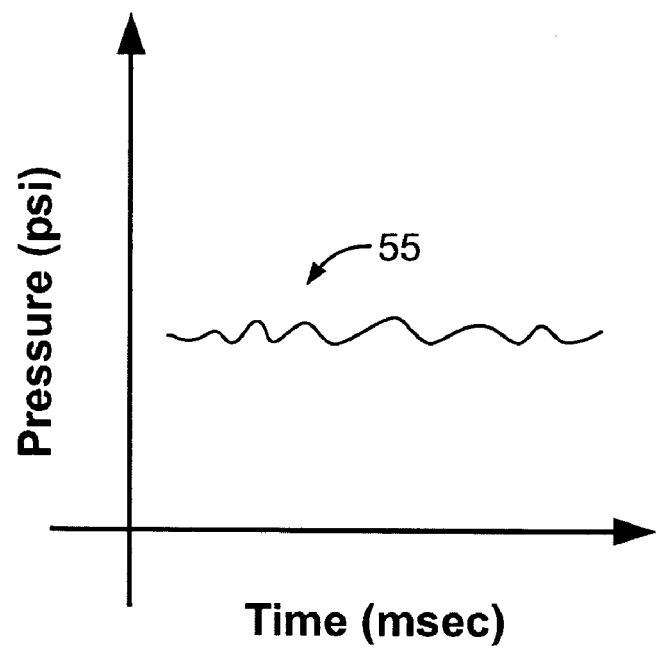
FIG. 4 is a graphical representation of a pressure wave developed within a combustion device operating at a low dynamic state versus time.

FIG. 4 graphically represents the pressure oscillations measured in pounds per square inch within engine 10 during engine operation at second operating state 55 (low dynamics operating state). In contrast to the pressure oscillations measured during first operating state 50, the pressure oscillations measured over time for second operating state 55 maintain a generally random wave without approaching an undesirable maximum amplitude, which result in engine component damage and/or engine failure as discussed above. However, it is not desirable to maintain engine operation at second operating state 55 because such engine operation generates undesirable $NO_X$ emissions levels. Therefore, at expiration of a set time duration, fuel transfer circuit 40 is activated to initiate a change in engine operation from second operating state 55 to first operating state 50, as represented by reversible arrow 60 in FIG. 2. Fuel transfer circuit 40 controls the switching between the first fuel split ratio and the second fuel split ratio to actively control the combustion dynamics developed within engine 10 and prevent combustion dynamics levels sufficient to damage engine components and/or failure of engine 10.

Figure 5:
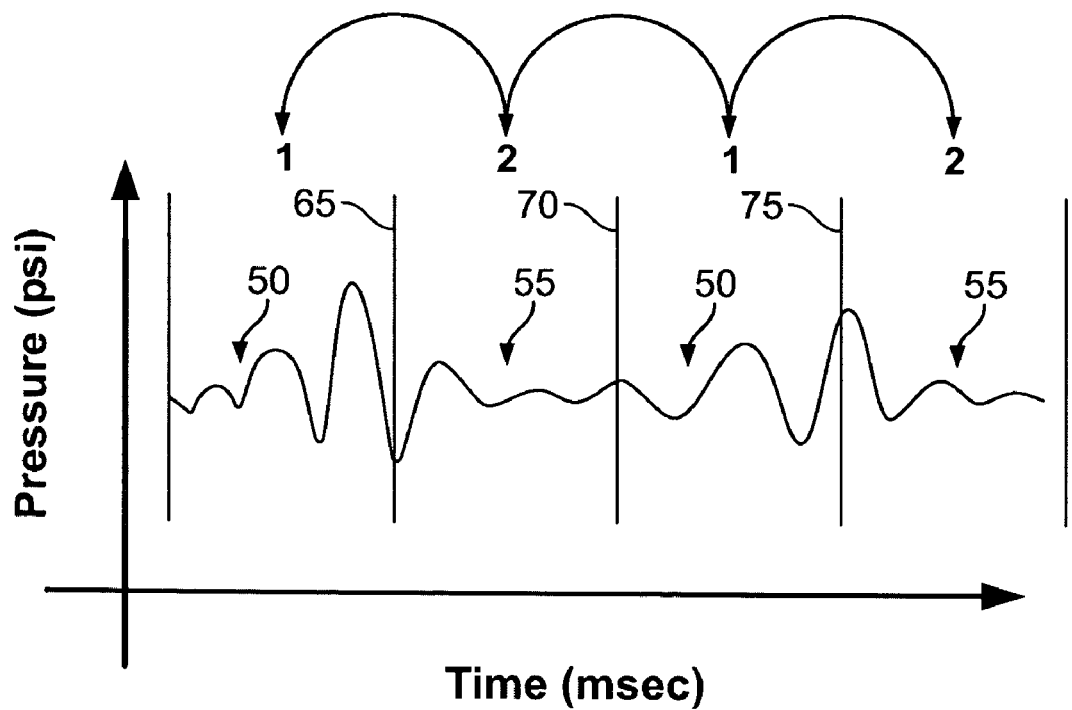
FIG. 5 is a graphical representation of a pressure wave verses time for the combustion device switching between a high dynamic state and a low dynamic state to control dynamics within the combustion device.

FIG. 5 graphically represents the pressure developed within engine 10 during engine operation. Engine 10 operates at first operating state 50 within an unstable operating region for an adjustable time duration. During the time duration, the amplitude of the pressure wave increases and approaches an undesirable amplitude representing component damage and/or engine failure, requiring activation of fuel transfer circuit 40 to initiate switching to a second fuel split ratio, represented by line 65 in FIG. 5. Upon activation of fuel transfer circuit 40, engine 10 operates at second operating state 55 within the stable operating region. Within second operating state 55, the amplitude of the pressure wave remains generally steady within an acceptable pressure range, represented graphically by a general sinusoidal wave as shown in FIGS. 4 and 5. At a suitable time, represented by line 70 in FIG. 5, fuel transfer circuit 40 is activated to initiate engine operation within first operating state 50. Upon expiration of the set time duration, represented by line 75 in FIG. 5, fuel transfer circuit 40 is again activated to initiate engine operation within second operating state 55. Thus, the present invention provides an apparatus to actively control the combustion dynamics level developed within a combustion device, such as engine 10, by alternating periodically at a low frequency between first operating state 50, representing a high dynamics operating state, and second operating state 55, representing a low dynamics operating state.

In one embodiment, first fuel line 12 is initially configured to supply about 40% of the total fuel consumed by engine 10 and second fuel line 14 is initially configured to supply about 60% of the total fuel consumed by engine 10. It is apparent to those skilled in the art and guided by the teachings herein provided that first fuel line 12 may be configured to supply any suitable amount of fuel to engine 10 either less than about 40% or greater than about 40%, with second fuel line 14 configured to supply the remaining required fuel to engine 10. During engine operation, fuel transfer circuit 40 is activated to increase or decrease the amount of fuel supplied through first fuel line 12 by a desired percentage not greater than about 10%, for example about 2%. The amount of fuel supplied by second fuel line 14 is correspondingly adjusted. For example, fuel transfer circuit 40 is activated to reduce the amount of fuel supplied through first fuel line 12 to about 38% of the total fuel consumed by engine 10. The amount of fuel supplied through second fuel line 14 is correspondingly increased to about 62% of the total fuel consumed by engine 10. As an alternative example, fuel transfer circuit 40 may be activated to increase the amount of fuel supplied through first fuel line 12 to about 44% of the total fuel consumed by engine 10. The amount of fuel supplied through second fuel line 14 is correspondingly decreased to about 56% of the total fuel consumed by engine 10.

In the exemplary embodiment, a method for controlling combustion dynamics levels within a chamber of a combustion device, such as gas turbine engine 10 is provided. As shown in FIG. 2, the method includes determining a combustion dynamics level and $NO_X$ emissions level for each fuel split ratio within an operating range of engine 10. In one embodiment, a combustion dynamics level and/or a $NO_X$ emissions level for a plurality of fuel split ratios are defined for an operating range of engine 10. The combustion dynamics level is a measurement of pressure within engine 10 during a combustion process. The $NO_X$ emissions level is a measurement of $NO_X$ emitted from engine 10 during the combustion process. In the exemplary embodiment, fuel split ratio is a ratio of fuel supplied to engine 10 through first fuel line 12 to a total amount of fuel supplied to engine 10, equal to the amount of fuel supplied through first fuel line 12 and the amount of fuel supplied through second fuel line 14. The first operating state defined by a first fuel split ratio and the second operating state defined by a second fuel split ratio is then determined.

A graphical representation of high dynamics operating states and low dynamics operating states are defined by plotting combustion dynamics levels and associated $NO_X$ emissions levels verses fuel split ratios within the operating range of engine 10, as shown in FIG. 2. The stable operating region in which engine 10 operates in a stable condition is represented by a low dynamics operating state wherein the combustion process generates a relatively low level of combustion dynamics. However, the low dynamics operating state undesirably generates a relatively high level of $NO_X$ emissions. Conversely, the unstable operating region in which engine 10 operates in an unstable condition is represented by an undesirably high dynamics operating state wherein the combustion process generates a relatively high level of combustion dynamics but advantageously generates a relatively low level of $NO_X$ emissions.

Thus, with engine 10 operating within low dynamics operating state 55, combustion dynamics, including pressure oscillations and/or acoustical vibrations, is relatively quite. However, it is generally not feasible to operate entirely within the stable operating condition due to the undesirable high $NO_X$ emissions level. In contrast, with engine 10 operating within the unstable operating region, $NO_X$ emissions are advantageously low. However, it is generally not feasible to operate entirely within the unstable operating condition due to the undesirable pressure oscillation and/or acoustical vibrations, which ultimately result in engine component damage and/or engine failure.

From the graph plotted for combustion dynamics levels and associated $NO_X$ emissions levels verses fuel split ratios within the operating range of engine 10, as shown in FIG. 2, a first operating state 50 outside a stable operating region, e.g. within an unstable operating region, is defined by a first fuel split ratio. A second operating state 55 within a stable operating region is defined by a second fuel split ratio. In one embodiment, a firing temperature at which the first fuel split ratio is selected to define first operating state 50 is the same as a firing temperature at which the second fuel split ratio is selected to define second operating state 55.

The combustion dynamics level of engine 10 is actively controlled by modulating or switching between first operating state 50 and second operating state 55. In one embodiment, fuel transfer circuit 40 controls an amount of fuel that flows through first fuel line 12 and/or second fuel line 14. In one embodiment, a high dynamics operating state is defined at a first fuel split ratio. In this embodiment, the first fuel split ratio is a ratio of an amount of fuel supplied to engine 10 through first fuel line 12 to a total amount of fuel supplied to engine 10. A low dynamics operating state is defined at a second fuel split ratio different from the first fuel split ratio. The second fuel split ratio is a second ratio of an amount of fuel supplied to engine 10 through first fuel line 12 to a total amount of fuel supplied to engine 10. The combustion dynamics level within engine 10 is controlled by periodically switching between the first fuel split ratio and the second fuel split ratio at a set time duration of about 10 msec to about 100 msec.

At the high dynamics operating state and/or at the low dynamics operating state, a first amount of fuel supplied to engine 10 through first fuel line 12 and a second amount of fuel supplied to engine 10 through second fuel line 14 is actively controlled. A first amount of fuel is supplied through first fuel line 12 equal to about 10% to about 90% of a total amount of fuel supplied to the combustion device and a second amount of fuel supplied through second fuel line 14 is equal to the remaining percentage of the total fuel supplied to the combustion device. In one embodiment, the first amount of fuel supplied by first fuel line 12 or the second amount of fuel supplied by second fuel line 14 is increased and the other of the first amount of fuel or the second amount of fuel is correspondingly decreased to periodically modulate or switch between the first fuel split ratio and the second fuel split ratio. For example, the first amount of fuel is increased by a percentage value not greater than about 10% of the total amount of fuel supplied to the combustion device and the second amount of fuel is correspondingly decreased by the percentage value. Alternatively, the first amount of fuel is decreased by a percentage value not greater than about 10% of the total amount of fuel supplied to the combustion device and the second amount of fuel is correspondingly increased by the percentage value.

In this embodiment, fuel transfer circuit 40 is activated to adjust a first amount of fuel that flows through first fuel line 12 and a second amount of fuel that flows through second fuel line 14. For example, fuel transfer circuit 40 is activated to increase or decrease the first amount of fuel by a fuel input adjustment value not greater than about 10% of a total amount of fuel supplied to the combustion device and correspondingly decrease or increase, respectively, the second amount of fuel by the fuel input adjustment value.

In an alternative embodiment, gas turbine engine 10 includes any suitable number of fuel lines. For example, in this alternative embodiment, in addition to first fuel line 12 and second fuel line 14, a tertiary or third fuel line and a quaternary or fourth fuel line each is independently operatively connected to engine 10. Fuel transfer circuit 40 controls an amount of fuel that flows through first fuel line 12, second fuel line 14, third fuel line and/or fourth fuel line.

The above-described method and apparatus of the present invention actively controls combustion dynamics levels developed within a gas turbine engine during engine operation. More specifically, a fuel transfer circuit periodically adjusts a path of at least a portion of the fuel supplied to the gas turbine engine through a first fuel line and/or a second fuel line to effectively mitigate the combustion dynamics levels within the gas turbine engine. The periodic modulation or switching at low frequency between a high dynamic state and a low dynamic state effectively controls the combustion dynamics levels developed within the gas turbine engine to mitigate the combustion dynamics levels over time.

Exemplary embodiments of a method and an apparatus for actively controlling combustion dynamics levels developed within a gas turbine engine during engine operation are described above in detail. The method and apparatus are not limited to the specific embodiments described herein, but rather, steps of the method and/or elements or components of the apparatus may be utilized independently and separately from others described herein. Further, the described method steps and/or apparatus elements or components can also be defined in, or used in combination with, other methods, apparatus and/or systems and are not limited to practice only as described herein.

While the invention has been described in terms of various specific embodiments, those skilled in the art will recognize that the invention can be practiced with modification within the spirit and scope of the claims.

What is claimed is:

1. A method for controlling a combustion dynamics level within a combustion device, the method comprises:

defining a high dynamics operating state at a first fuel split ratio, wherein the first fuel split ratio is a ratio of an amount of fuel supplied to the combustion device through a first fuel line to a total amount of fuel supplied to the combustion device;

defining a low dynamics operating state at a second fuel split ratio different from the first fuel split ratio, wherein the second fuel split ratio is a second ratio of an amount of fuel supplied to the combustion device through the first fuel line to the total amount of fuel supplied to the combustion device;

controlling a first amount of fuel supplied through the first fuel line and a second amount of fuel supplied through the second fuel line that is different from the first amount of fuel at least one of the first fuel split ratio and the second fuel split ratio; and periodically switching between the first fuel split ratio and the second fuel split ratio, by increasing one of the first amount of fuel and the second amount of fuel by a percentage value not greater than about 10% of the total amount of fuel supplied to the combustion device, to control the combustion dynamics level within the combustion device.

2. A method in accordance with claim 1 wherein periodically switching between the first fuel split ratio and the second fuel split ratio further comprises setting a time duration of about 10 msec to about 100 msec for each of the high dynamics operating state and the low dynamics operating state.

3. A method in accordance with claim 1 further comprising, in at least one of the high dynamics operating state and the low dynamics operating state, supplying a first amount of fuel to a first fuel line equal to about 10% to about 90% of the total amount of fuel supplied to the combustion device.

4. A method in accordance with claim 3 further comprising adjusting the first amount of fuel by a first fuel input adjustment value not greater than about 10% of the total amount of fuel supplied to the combustion device.

5. A method in accordance with claim 4 further comprising adjusting the second amount of fuel by a second fuel input adjustment value that is opposite of the first fuel input adjustment value.

6. A method to facilitate controlling a combustion dynamics level within a combustion device, said method comprises:

defining a combustion dynamics level and a $NO_X$ emissions level for a plurality of fuel split ratios for an operating range of the combustion device, wherein the combustion dynamics level is a measurement of pressure within the combustion device during a combustion process, the $NO_X$ emissions level is a measurement of $NO_X$ emitted from the combustion device during the combustion process, and the fuel split ratio is a ratio of an amount of fuel supplied to the combustion device through a first fuel line to a total amount of fuel supplied to the combustion device;

determining a first operating state defined by a first fuel split ratio;

determining a second operating state defined by a second fuel split ratio different from the first operating state; and controlling the combustion dynamics level within the combustion device by alternating between the first operating state and the second operating state by periodically varying the amount of fuel supplied through the first fuel line by an amount no greater than about 10% of the total amount of fuel supplied.

7. A method in accordance with claim 6 wherein controlling the combustion dynamics level within the combustion device by alternating between the first operating state and the second operating state further comprises activating a fuel transfer circuit to adjust a first amount of fuel that flows through the first fuel line and a second amount of fuel that flows through a second fuel line.

8. A method in accordance with claim 6 wherein determining a first operating state defined by a first fuel split ratio further comprises adjusting each of a first amount of fuel supplied to the combustion device through the first fuel line and a second amount of fuel supplied to the combustion device through a second fuel line.

9. A method in accordance with claim 8 wherein the first amount of fuel is increased by a fuel input adjustment value not greater than about 10% of the total amount of fuel supplied to the combustion device and the second amount of fuel is decreased by the fuel input adjustment value.

* * * * *